United States Patent
Baumgartner et al.

(10) Patent No.: US 9,710,577 B2
(45) Date of Patent: Jul. 18, 2017

(54) HEAT SOURCE INTEGRATION FOR ELECTROMIGRATION ANALYSIS

(71) Applicant: International Business Machines Corporation, Armonk, NY (US)

(72) Inventors: Steven J. Baumgartner, Zumbro Falls, MN (US); James M. Johnson, Milton, VT (US); David M. Onsongo, Manor, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/877,189

(22) Filed: Oct. 7, 2015

(65) Prior Publication Data
US 2017/0103146 A1    Apr. 13, 2017

(51) Int. Cl.
*G06F 17/50* (2006.01)
(52) U.S. Cl.
CPC .................. *G06F 17/5009* (2013.01)
(58) Field of Classification Search
CPC .................................. G06F 17/5036
USPC ................. 716/106, 109, 112, 120
See application file for complete search history.

(56) References Cited

U.S. PATENT DOCUMENTS

| | | | |
|---|---|---|---|
| 6,038,383 A | 3/2000 | Young et al. | |
| 6,513,000 B1 | 1/2003 | Toda | |
| 6,634,013 B2 | 10/2003 | Shinzawa | |
| 7,315,992 B2 * | 1/2008 | Bhooshan et al. | G06F 17/5036 716/112 |
| 7,716,620 B2 | 5/2010 | Agarwal et al. | |
| 7,971,171 B2 | 6/2011 | Keinert et al. | |
| 8,640,062 B2 | 1/2014 | Agarwal et al. | |
| 2004/0049750 A1 | 3/2004 | Gentry et al. | |
| 2008/0086708 A1 | 4/2008 | Rittman | |

(Continued)

FOREIGN PATENT DOCUMENTS

WO    2008094143 A2    8/2008

OTHER PUBLICATIONS

"Thermal Reliability for FinFET and 3D-IC Designs", ANSYS, Inc., Design Automation Conference 2014, Jun. 23, 2014, 14 pp.

(Continued)

*Primary Examiner* — Sun Lin
(74) *Attorney, Agent, or Firm* — Patterson + Sheridan, LLP

(57) ABSTRACT

A computer-implemented method includes receiving layout information associated with a circuit design at an extractor, and generating three-dimensional (3-D) heat source grid information based on the layout information, an extracted netlist, and wire information. The method also includes sending the wire information to an electromigration(EM)/current(IR) analyzer, sending the extracted netlist to a circuit simulator, and sending the 3-D heat source grid information to a thermal analysis component. The circuit simulator is configured to generate temperature waveforms and current waveforms based on the extracted netlist. The thermal analysis component is configured to generate heat source information to be provided to the EM/IR analyzer. The method further includes determining, at the EM/IR analyzer, an electromigration risk associated with a wire based on the wire information, the current waveforms, and the heat source information.

20 Claims, 4 Drawing Sheets

(56) References Cited

U.S. PATENT DOCUMENTS

2009/0013290 A1    1/2009   Keinert et al.
2009/0031264 A1    1/2009   Rittman
2009/0164183 A1    6/2009   Smith et al.
2013/0298101 A1   11/2013   Chandra

OTHER PUBLICATIONS

ChipGuy, "Electromigration Analysis and FinFET Self-Heating", SemiWiki.com—The Open Forum for Semiconductor Professionals, Sep. 24, 2015, 3 pp.

Alam, Irshad, "Netlist Based IR Drop and Electromigration Analysis Flow in Virtuoso UltraSim", Cadence Designer Network—cdn Live, India, 2007, https://www.cadence.com/rl/Resources/conference_papers/4.8_presentationIndia.pdf, 29 pp.

* cited by examiner

HEAT SOURCE INTEGRATION FOR ELECTROMIGRATION ANALYSIS

I. FIELD OF THE DISCLOSURE

The present disclosure relates generally to heat source integration for electromigration analysis.

II. BACKGROUND

In state-of-the-art integrated circuits, devices scale with each successive technology node, resulting in higher current densities per unit area. With higher current density, the copper wires in integrated circuits become more susceptible to electromigration which may cause the integrated circuit to fail.

Electromigration is the process by which voids are formed in a metallic conductor (e.g. copper/aluminum wires). At high current densities, a net atomic flux can be induced by a transfer of electron momentum to the atoms in the crystalline structure of the metallic conductors. The atomic flux may result in voids which can cause a circuit to break open or may result in hillocks (e.g., accumulation metal leading to shorts with adjacent metal lines). This process is accelerated by increased temperature and at high current densities, a signal line will heat due to Joule heating and may also induce a temperature increase in neighboring electric lines (and vice versa). In order to avoid deleterious effects the maximum temperature of the signal lines should be limited.

III. SUMMARY OF THE DISCLOSURE

According to an embodiment, a computer-implemented method is disclosed. The computer-implemented method includes receiving layout information associated with a circuit design at an extractor. The method includes generating three-dimensional (3-D) heat source grid information based on the layout information, an extracted netlist, and wire information. The method includes sending the wire information to an electromigration(EM)/current(IR) analyzer, sending the extracted netlist to a circuit simulator, and sending the 3-D heat source grid information to a thermal analysis component. The circuit simulator is configured to generate temperature waveforms and current waveforms based on the extracted netlist. The thermal analysis component is configured to generate heat source information to be provided to the EM/IR analyzer. The method further includes determining, at the EM/IR analyzer, an electromigration risk associated with a wire based on the wire information, the current waveforms, and the heat source information.

According to another embodiment, a computer-readable storage medium is disclosed. The computer-readable storage medium stores instructions that, when executed by a computing device, cause the computing device to perform various operations. The operations include generating 3-D heat source grid information based on layout information associated with a circuit design, an extracted netlist, and wire information. The operations include sending the wire information to an EM/IR analyzer, sending the extracted netlist to a circuit simulator, and sending the 3-D heat source grid information to a thermal analysis component. The circuit simulator is configured to generate temperature waveforms and current waveforms based on the extracted netlist. The thermal analysis component is configured to generate heat source information to be provided to the EM/IR analyzer. The method further includes determining, at the EM/IR analyzer, an electromigration risk associated with a wire based on the wire information, the current waveforms, and the heat source information.

According to another embodiment, a computing device is disclosed that includes an extractor, a circuit simulator, a thermal analysis component, and an EM/IR analyzer. The extractor is configured to generate 3-D heat source grid information based on layout information associated with a circuit design, an extracted netlist, and wire information. The circuit simulator is configured to receive the extracted netlist from the extractor and to generate heat source information. The EM/IR analyzer is configured to receive the wire information from the extractor, to receive the heat source information from the thermal analysis component, and to determine an electromigration risk associated with a wire based on the wire information, the current waveforms, and the heat source information.

One advantage of the present disclosure is the ability to calculate a total effective self-heating from both front-end-of-line (FEOL) and back-end-of-line (BEOL) heat sources for use in electromigration analysis, potentially enabling more wire design flexibility compared to blanket rule based approaches.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

IV. BRIEF DESCRIPTION OF THE DRAWINGS

V. DETAILED DESCRIPTION

Figure 1:
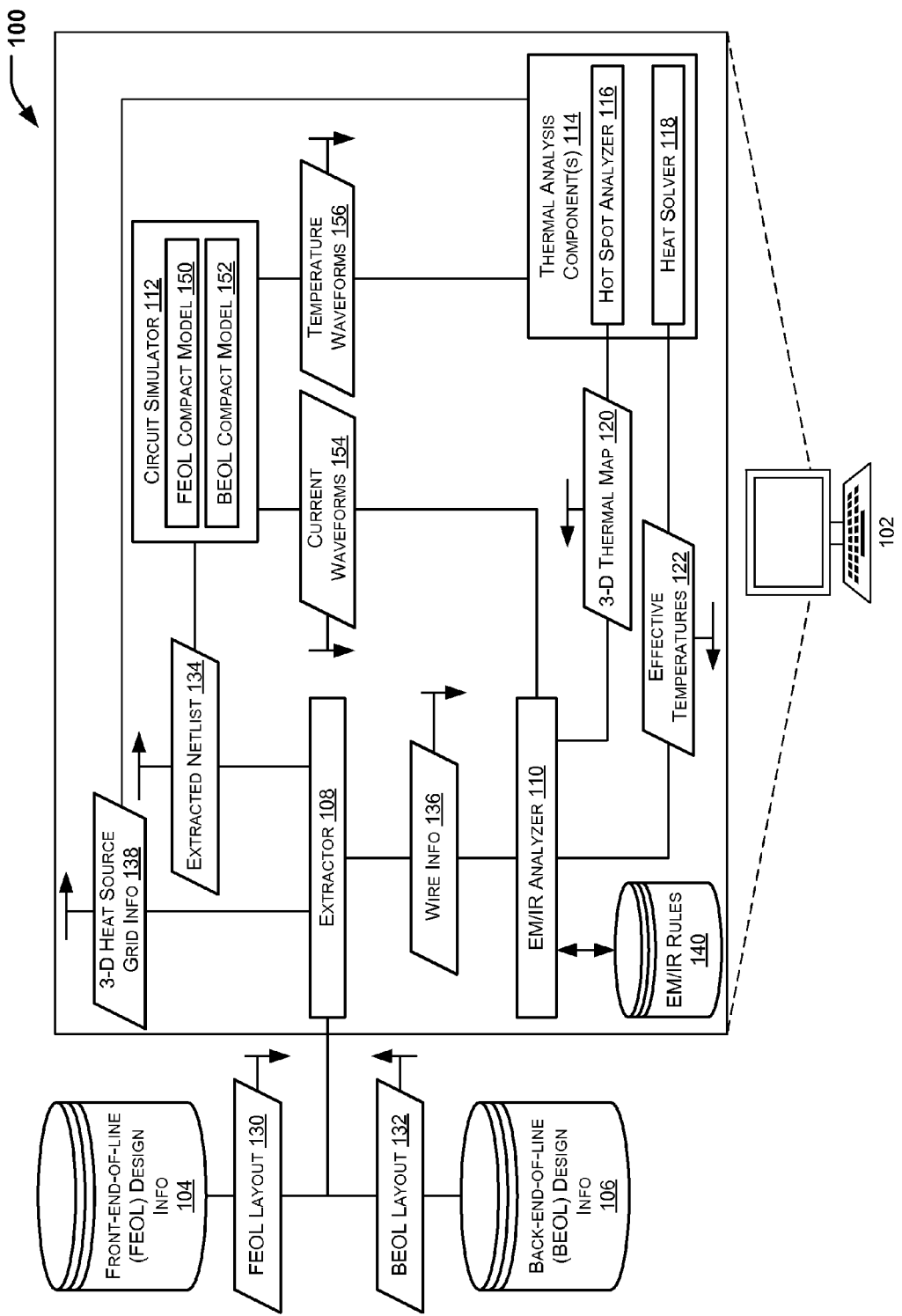
FIG. 1 is a block diagram of a system of heat source integration for electromigration analysis, according to a particular embodiment.

Electromigration is a well understood phenomenon in back-end-of-line (BEOL) wires (e.g., copper wires). To account for this, foundries release rules for direct current (DC), root mean square (RMS), and peak allowed currents as well as rules for self-heating of BEOL wires. To check for violation of these rules, simulators may be used to calculate functional currents, and the functional currents may be compared to the allowed currents for potential violations. Typically, only self-heating from BEOL wires is determined, with self-heating from front-end-of-line (FEOL) devices ignored. However, as technologies scale to 22 nanometers (nm) and below, self-heating from FEOL devices may become significant. As such, ignoring self-heating from FEOL devices may no longer be acceptable when evaluating potential electromigration in BEOL wires.

The present disclosure describes systems and methods of integrating FEOL and BEOL heat sources into EM/IR analysis. The present disclosure describes a framework for calculating a total effective self-heating from both FEOL and BEOL heat sources for use in EM limit calculations. The framework of the present disclosure incorporates effects of self-heating from FEOL passive and active devices into calculation of allowed $I_{peak}$, $I_{rms}$ and $I_{dc}$ for BEOL electromigration and self-heating.

The present disclosure incorporates extraction enhancements to create a 3-D grid space with vector assignments for effective thermal conductivity and diffusivity on which heat sources can be superimposed. Thermal vectors may be computed from dielectric, wire and via properties, and the heat sources may correspond to FEOL and BEOL compact model self-heating outputs. During simulation, the compact models compute temperatures at heat sources and store this information. Subsequently, the effective thermal conductivity vector grid may be utilized to compute how temperature is distributed over time, and an effective average temperature may be computed for each wire. This effective temperature may be used together with a calculation for average and RMS current in the wire to determine whether the wire passes or fails EM criteria.

To illustrate, in an integrated circuit design that includes FinFET transistors and a silicon insulator (SOI) substrate, the SOI substrate may not provide a suitable thermal path for heat to be dissipated away from an active FinFET transistor because the SOI substrate is both an effective electrical insulator as well as a thermal insulator. Power dissipation associated with operation of a device results in a temperature increase, and metallurgy (e.g., contacts, heat sinks, etc.) may provide a thermal path to dissipate heat from the transistor. A temperature analysis may be complicated, as heat from the transistor encounters thermal resistance of the substrate, the contacts, and the metallurgy to/from the contacts. The analysis of how the heat is dissipated through those thermal resistances in the electrical network is complicated. In the present disclosure, a netlist of thermal resistances may be used for such an analysis.

In a typical modelling approach, a "worst-case" approach includes applying a blanket rule to all transistors on the chip. An assumption is made that every transistor on the chip is cooler than that rule. Based on the assumption that every transistor is cooler than that rule, an amount of current that a specific conductor can handle may be determined according to that rule. However, if every transistor is not at the same temperature, then some conductors may be over-designed. That is, the worst-case approach designs everything to be compatible with the hottest transistor on the chip. Even cool transistors may have wide metallurgy because of the conservative rule. In the present disclosure, the power dissipated in particular transistors may be converted to a temperature, and a netlist of thermal resistances may be used to determine variable rules, such that each conductor is evaluated for EM limits based on the appropriate temperature.

While some analysis tools may be capable of identifying EM or IR violations, such violations may be identified absent a heating mechanism. Rather, a user may manually input a temperature, but such analysis tools do not calculate self-consistently how much heat is generated for individual wires/devices. Instead, a blanket temperature limit is applied to the entire chip. Existing analysis tools are not capable of integrating the process of identifying high temperature locations and interpreting how such high temperature locations may impact wires nearby. Unlike blanket rule based approaches, the present disclosure may allow designers more flexibility when designing wires. For example, in locations that do not represent high temperature "hot spots," wire limits may be relaxed (e.g., reduced wire widths), while wire limits may be adjusted (e.g., increased wire widths) in areas that are near high temperature hot spots that represent areas of increased risk for electromigration.

Referring to FIG. 1, a particular embodiment of a system of heat source integration for EM/IR analysis is illustrated and generally designated 100. In FIG. 1, rather than utilizing a blanket rule approach, the system 100 may identify high temperature areas ("hot spots") and determine associated impacts on nearby wires (e.g., copper wires). Unlike blanket rule based approaches, the system 100 of FIG. 1 may provide for a more targeted EM/IR analysis approach. For example, rather than increase the size of all wires to reduce EM risk, wires may be selectively adjusted based on local heat effects (e.g., increased wire sizes in high temperature areas and/or relaxed wire limits in low temperature areas).

In the particular embodiment illustrated in FIG. 1, the system 100 includes a computing device 102, FEOL design information 104, and BEOL design information 106. In the example of FIG. 1, the computing device 102 includes an extractor 108, an EM/IR analyzer 110, a circuit simulator 112, and one or more thermal analysis components 114. In the particular embodiment illustrated in FIG. 1, the thermal analysis component(s) 114 include a hot spot analyzer 116 and a heat solver 118. In some cases, the hot spot analyzer 116 may be utilized to generate a 3-D thermal map 120 for use by the EM/IR analyzer 110, as described further herein (e.g., with respect to FIG. 2). In other cases, the heat solver 118 may be utilized to generate effective temperatures 122 for use by the EM/IR analyzer 110, as described further herein (e.g., with respect to FIG. 3). Thus, while FIG. 1 illustrates an example in which the computing device 102 includes more than one thermal analysis component, it will be appreciated that in other cases the computing device 102 may include an alternative number of thermal analysis components (e.g., the hot spot analyzer 116 or the heat solver 118).

The extractor 108 may be configured to receive layout information from one or more data sources. The layout information represents physical design information (e.g., a 3-D "picture" of the physical features for a particular design). For illustrative purposes only, FIG. 1 depicts the extractor 108 receiving FEOL layout information 130 from the FEOL design information 104 and BEOL layout information 132 from the BEOL design information 106. While the FEOL design information 104 and the BEOL design information 106 are illustrated as separate sources of layout information, it will be appreciated that the FEOL layout information 130 and the BEOL layout information 132 may be stored at the same data storage (e.g., separate from the computing device 102 or stored at the computing device 102).

The extractor 108 is further configured to generate, based on the layout information (e.g., the FEOL layout information 130 and the BEOL layout information 132), an extracted netlist 134, and wire information 136, 3-D heat source grid information 138. The extracted netlist 134 may represent circuit topology information which describes components of an integrated circuit design and their interconnections. A net is a direct interconnect between a driver cell and one or more load cells. The components can be described either by physically oriented models or can be described in an abstract manner. The wire information 136 may include wire type information (e.g., copper, aluminum) and width information, among other types of information.

The extractor 108 is configured to send the wire information 136 to the EM/IR analyzer 110. As described further herein, in some cases, the EM/IR analyzer 110 may be configured to utilize the wire information 136 and the 3-D thermal map 120 generated by the hot spot analyzer 116 to determine wire(s) at high risk for electromigration (e.g., based on one or more EM/IR rules 140). In other cases, as further described herein, the EM/IR analyzer 110 may be configured to utilize the wire information 136 and the effective temperatures 122 calculated by the heat solver 118 to determine EM/IR pass/fail status (e.g., based on the one or more EM/IR rules 140). As an example, for different wire types/widths, an EM/IR pass/fail status may be determined based on different rules for acceptable current that may be passed through a particular wire at a particular temperature.

The extractor 108 is configured to send the extracted netlist 134 to the circuit simulator 112. In some cases, the circuit simulator 112 may be configured to utilize virtual measuring devices such as amperemeters, network analyzers, logic analyzers, etc. to yield measured values of parameters of the integrated circuit under analysis. During the circuit simulation phase, compact models may utilize currents to compute an amount of heat that is generated at each point source as a function of time. FIG. 1 illustrates that the compact models may include a FEOL compact model 150 and a BEOL compact model 152. The circuit simulator 112 may be configured to calculate current waveforms 154 and temperature waveforms 156.

FIG. 1 further illustrates that the circuit simulator 112 may be configured to send the current waveforms 154 to the EM/IR analyzer 110 and to send the temperature waveforms 156 to the thermal analysis component(s) 114. In some cases, the extractor 108 may be configured to send the 3-D heat source grid information 138 to the hot spot analyzer 116. In other cases, the extractor 108 may be configured to send the 3-D heat source grid information 138 to the heat solver 118. Thus, in some cases, the circuit simulator 112 may send the temperature waveforms 156 to the hot spot analyzer 116 (e.g., as described further herein with respect to FIG. 2), while in other cases, the circuit simulator 112 may send the temperature waveforms 156 to the heat solver 118 (e.g., as described further herein with respect to FIG. 3).

As described further herein, the hot spot analyzer 116 may be used to determine steady state/average heat information, while the heat solver 118 may be used to generate a dynamic heat flow map. To illustrate, the heat solver 118 may model each wire and each transistor as a heat source based on the information that is available. This may allow heat flow to be modeled as an active map, not just a hot spot. Rather, the heat solver 118 may determine an effective heat for each device and each wire. This process may be more computationally intensive, but the ability to model heat flow in substantially real time may allow for guard band reduction.

FIG. 1 illustrates that, in some embodiments, the hot spot analyzer 116 may be configured to calculate the 3-D thermal map 120 and to send the 3-D thermal map 120 to the EM/IR analyzer 110. FIG. 1 further illustrates that, in other embodiments, the heat solver 118 may be configured to calculate the effective temperatures 122 and to send the effective temperatures 122 to the EM/IR analyzer 110.

The EM/IR analyzer 110 may be configured to calculate current information, such as a peak current value ($I_{peak}$), a direct current value ($I_{dc}$), and a root-mean-square (RMS) current value ($I_{rms}$), among other alternatives. In some cases (e.g., as described further herein with respect to FIG. 2), the EM/IR analyzer 110 may be configured to determine wires at high risk for electromigration based on the wire information 136 (received from the extractor 108), the current waveforms 154 (received from the circuit simulator 112), and the 3-D thermal map 120 (received from the hot spot analyzer 116). In other cases (e.g., as described further herein with respect to FIG. 3), the EM/IR analyzer 110 may be configured to determine EM/IR pass/fail status based on the wire information 136 and the effective temperatures 122 (received from the heat solver 118).

In operation, the extractor 108 may generate the 3-D heat source grid information 138 based on the FEOL layout information 130, the BEOL layout information 132, the extracted netlist 134, and the wire information 136. The 3-D heat source grid information 138 may represent a spatial arrangement of locations for calculation of an effective temperature. As an illustrative example, the 3-D heat source grid information 138 may identify locations (e.g., every micron in X, Y, and Z directions) where temperature is to be calculated. To illustrate, in the context of a design that includes five metal layers, the fifth metal layer has a different Z-axis location than the first metal layer, and a transistor at the lowest level represents a heat source that has more impact on temperature for the first metal layer than the fifth metal layer. In some cases, rules for grid spacing may be determined at least in part based on a minimum pitch of a relevant layer, among other information.

Figure 2:
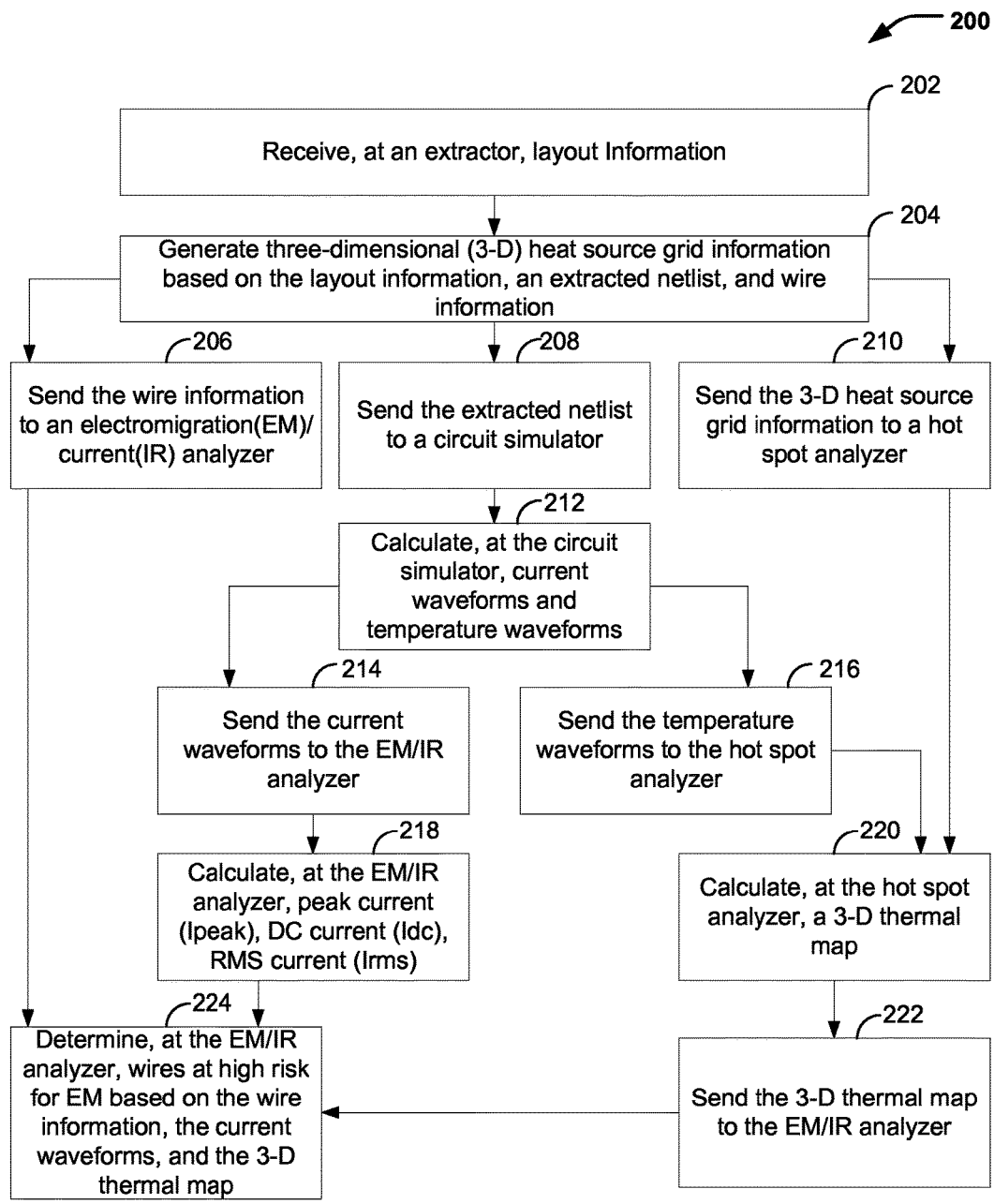
FIG. 2 is a flow diagram illustrating a particular embodiment of a method of heat source integration for electromigration analysis.

In some cases (e.g., as further described herein with respect to the example of FIG. 2), the 3-D heat source grid information 138 may be utilized by the hot spot analyzer 116 to generate the 3-D thermal map 120 to be provided to the EM/IR analyzer 110. In other cases (e.g., as further described herein with respect to FIG. 3), the 3-D heat source grid information 128 may be utilized by the heat solver 118 to generate the effective temperatures 122 to be provided to the EM/IR analyzer 110.

In cases where the 3-D heat source grid information 138 is sent to the hot spot analyzer 116, the hot spot analyzer 116 may utilize the 3-D heat source grid information 138 to superimpose heat sources on particular 3-D grid locations (e.g., locations corresponding to every micron in each of the X, Y, and Z directions). To illustrate, the hot spot analyzer 116 may utilize various rules (e.g., diffusivity rules) and the temperature waveforms 156 generated by the circuit simulator 112 to determine temperature values at particular grid points on the 3-D grid. The hot spot analyzer 116 may output the 3-D thermal map 120 with temperatures superimposed at the X, Y, Z grid locations. In some cases, the temperatures may represent average temperatures in a three-dimensional area associated with a particular grid point (e.g., a half-micron in each direction from a particular X, Y, Z grid location).

As an illustrative, non-limiting example, a FinFET may be associated with a temperature increase of ten degrees, and the hot spot analyzer 116 may identify the FinFET as a heat source. Based on thermal diffusivity constants, the hot spot analyzer 116 may rely on various assumptions with respect to thermal properties of a substrate, wires, dielectrics, etc. In the example of a heat source in a channel of a transistor corresponding to a ten degree temperature increase, an effect of that heat source on the first metal layer may be three degrees, while an effect of that heat source on the fifth metal layer may be negligible (e.g., an assumption of zero degrees).

FIG. 1 illustrates that the 3-D thermal map 120 may be utilized during an EM/IR analysis phase. The EM/IR analyzer 110 may utilize the current waveforms 154 generated by the circuit simulator 112 to compute $I_{peak}$, $I_{rms}$ and $I_{dc}$ and may utilize the 3-D thermal map 120 generated at the hot spot analysis phase combined with the wire information 136 from the extraction phase to identify high risk wires.

As an illustrative, non-limiting example, the EM/IR analyzer 110 may determine a pass/fail status for a particular wire at a particular X, Y, Z location (according to the wire information 136 from the extraction phase) based on the current waveforms 154 and temperature information from the 3-D thermal map 120 corresponding to the particular X, Y, Z location of the wire. To illustrate, when the 3-D thermal map 120 indicates that the estimated temperature for the particular wire is 70 degrees, the wire may be able to pass a higher current than a wire with an estimated temperature of 105 degrees. Thus, the 3-D thermal map 120 may enable targeted three-dimensional electromigration analysis. When wires are identified as having a relatively high risk of electromigration, a circuit designer may elect to redesign the wire more conservatively. When wires are identified as having a relatively low risk of electromigration, the designer may elect to redesign the wire to a narrower width, potentially saving space for wires with increased widths due to high EM risk.

In cases where the 3-D heat source grid information 138 is sent to the heat solver 118, the heat solver 118 may utilize the 3-D heat source grid information 138 to superimpose heat sources on particular 3-D grid locations (e.g., locations corresponding to every micron in each of the X, Y, and Z directions). The 3-D heat source grid information 138 may include a 3-D heat grid and vectors for effective thermal conductivity/diffusivity for wires and dielectrics, in addition to extracted netlist information that is used for EM/IR flows. The heat solver 118 may calculate heat flow and effective temperature of wires (e.g., dynamic temperature values at each grid point). In some cases, the ability to model temperature values dynamically at individual grid points may allow for adjustments to a workflow, not just circuits to manage heat (e.g., for large scale circuit analysis, such as chip level analysis). The EM/IR analyzer 110 may utilize the effective temperatures 122 from the heat solver 118, the current waveforms 154 from the circuit simulator 112, and the wire information 136 from the extractor 108 to determine EM/IR pass/fail status (e.g., based on the EM/IR rules 140 for limits on current for particular types/widths of wires at particular temperatures).

Thus, FIG. 1 illustrates an example of a system of integrating FEOL and BEOL heat sources into electromigration checking. Rather than utilizing a blanket rule for EM/IR analysis, the system 100 of FIG. 1 may be utilized to identify high temperature areas and to determine an associated impact on nearby wires (e.g., copper wires). Unlike blanket rule based approaches, the system 100 of FIG. 1 may provide for a more targeted EM/IR analysis approach. For example, rather than increase the size of all wires to reduce EM risk, wires may be selectively adjusted based on local heat effects (e.g., increased wire sizes in high temperature areas and/or relaxed wire limits in low temperature areas).

FIG. 2 is a flow diagram that illustrates a particular embodiment of a method 200 of heat source integration for electromigration checking In FIG. 2, a "hot spot analyzer" may be used to generate a 3-D thermal map. An EM/IR analyzer may utilize currents from a simulator to compute $I_{peak}$, $I_{rms}$ and $I_{dc}$, and the EM/IR analyzer may utilize the 3-D thermal map, current density, and wire information to identify high risk wires.

The method 200 includes receiving, at an extractor, layout information, at 202. For example, referring to FIG. 1, the extractor 108 may receive the FEOL layout information 130 and the BEOL layout information 132 (e.g., from the FEOL design information 104 and the BEOL design information 106, respectively).

The method 200 includes generating 3-D heat source grid information based on the layout information, an extracted netlist, and wire information, at 204. For example, referring to FIG. 1, the extractor 108 may generate the 3-D heat source grid information 138 based on the FEOL layout information 130, the BEOL layout information 132, the extracted netlist 134, and the wire information 136.

The method 200 includes sending the wire information to an EM/IR analyzer, at 206. As described further herein, in the embodiment illustrated in FIG. 2, the EM/IR analyzer may utilize the wire information, current density, and a 3-D thermal map (generated by a hot spot analyzer) to determine wires at high risk for electromigration. For example, referring to FIG. 1, the extractor 108 may send the wire information 136 to the EM/IR analyzer 110. The EM/IR analyzer may utilize the wire information 136 (along with the current waveforms 154 from the circuit simulator 112 and the 3-D thermal map 120 generated by the hot spot analyzer 116) to determine wires at high risk for electromigration.

The method 200 includes sending the extracted netlist to a circuit simulator, at 208. For example, referring to FIG. 1, the extractor 108 may send the extracted netlist 134 to the circuit simulator 112. In the particular embodiment illustrated in FIG. 2, the method 200 includes sending the 3-D heat source grid information to a hot spot analyzer, at 210. For example, referring to FIG. 1, the extractor 108 may send the 3-D heat source grid information 138 to the hot spot analyzer 116.

The method 200 includes calculating, at the circuit simulator, current waveforms and temperature waveforms, at 212. For example, referring to FIG. 1, the circuit simulator 112 may calculate the current waveforms 154 and the temperature waveforms 156. The method 200 includes sending the current waveforms to the EM/IR analyzer, at 214. For example, referring to FIG. 1, the circuit simulator 112 may send the current waveforms 154 to the EM/IR analyzer 110. In the particular embodiment illustrated in FIG. 2, the method 200 includes sending the temperature waveforms to the hot spot analyzer, at 216. For example, referring to FIG. 1, the circuit simulator 112 may send the temperature waveforms 156 to the hot spot analyzer 116.

The method 200 includes calculating, at the EM/IR analyzer, current information, at 218. In some cases, the calculated current information may include a peak current value ($I_{peak}$), a direct current value ($I_{dc}$), and a root-mean-square (RMS) current value ($I_{rms}$), among other alternatives. For example, referring to FIG. 1, the EM/IR analyzer 110 may calculate current information (e.g., $I_{peak}$, $I_{dc}$, $I_{rms}$) based on the current waveforms 154 received from the circuit simulator 112.

In the particular embodiment illustrated in FIG. 2, the method 200 includes calculating, at the hot spot analyzer, a 3-D thermal map, at 220. For example, referring to FIG. 1, the hot spot analyzer 116 may calculate the 3-D thermal map 120. The method 200 includes sending the 3-D thermal map to the EM/IR analyzer, at 222. For example, referring to FIG. 1, the hot spot analyzer 116 may send the 3-D thermal map 120 to the EM/IR analyzer 110.

The method 200 includes determining, at the EM/IR analyzer, wires at high risk for electromigration based on the wire information (generated based on the layout information), the current waveforms (from the circuit simulator), and the 3-D thermal map (calculated at the hot spot analyzer), at 224. For example, referring to FIG. 1, the EM/IR analyzer 110 may utilize the wire information 136, the current waveforms 154, and the 3-D thermal map 120 to determine wires at high risk for electromigration based on a comparison to the EM/IR rules 140.

Thus, FIG. 2 illustrates an example of FEOL/BEOL heat source integration for electromigration checking FIG. 2 illustrates that an EM/IR analyzer may utilize currents from a simulator to compute $I_{peak}$, $I_{rms}$ and $I_{dc}$, and the EM/IR analyzer may utilize the 3-D thermal map combined with current density information and wire information to identify high risk wires.

Figure 3:
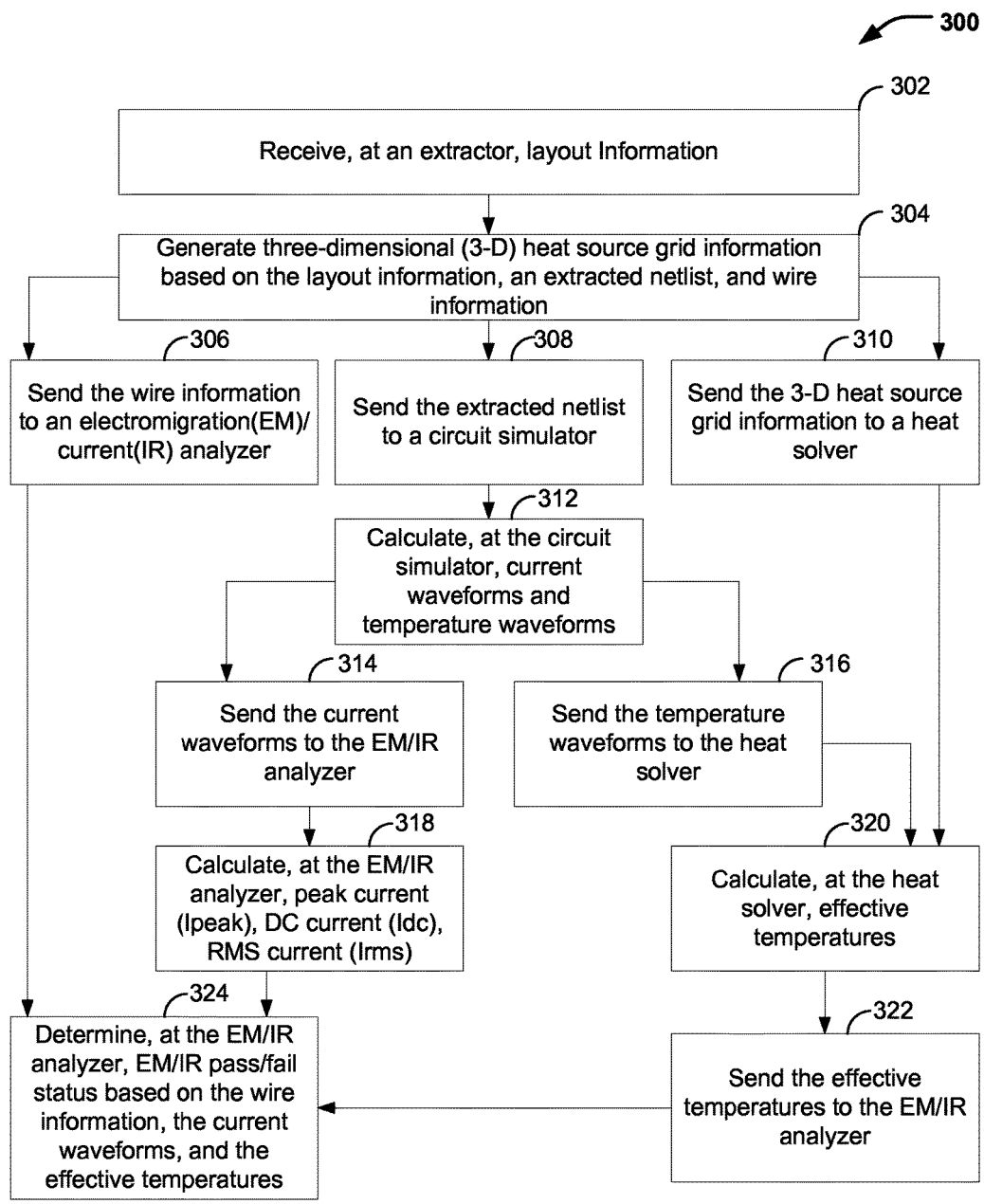
FIG. 3 is a flow diagram illustrating a particular embodiment of a method of heat source integration for electromigration analysis.

FIG. 3 is a flow diagram that illustrates a particular embodiment of a method 300 of heat source integration for EM/IR analysis. In FIG. 3, a "heat solver" may be used to determine heat flow/effective temperature. An EM/IR analyzer may utilize currents from a simulator to compute $I_{peak}$, $I_{rms}$ and $I_{dc}$, and the EM/IR analyzer may utilize effective heat information combined with wire information and current density information to determine EM/IR pass/fail status.

The method 300 includes receiving, at an extractor, layout information, at 302. For example, referring to FIG. 1, the extractor 108 may receive the FEOL layout information 130 and the BEOL layout information 132 (e.g., from the FEOL design information 104 and the BEOL design information 106, respectively).

The method 300 includes generating 3-D heat source grid information based on the layout information, an extracted netlist, and wire information, at 304. For example, referring to FIG. 1, the extractor 108 may generate the 3-D heat source grid information 138 based on the FEOL layout information 130, the BEOL layout information 132, the extracted netlist 134, and the wire information 136.

The method 300 includes sending the wire information to an EM/IR analyzer, at 306. As described further herein, in the embodiment illustrated in FIG. 3, the EM/IR analyzer may utilize the wire information, current density information, and effective temperatures calculated by a heat solver to determine EM/IR pass/fail status. For example, referring to FIG. 1, the extractor 108 may send the wire information 136 to the EM/IR analyzer 110. The EM/IR analyzer 110 may utilize the wire information 136 (along with the current waveforms 154 and the effective temperatures 122 generated by the heat solver 118) to determine wires at high risk for electromigration.

The method 300 includes sending the extracted netlist to a circuit simulator, at 308. For example, referring to FIG. 1, the extractor 108 may send the extracted netlist 134 to the circuit simulator 112. In the particular embodiment illustrated in FIG. 3, the method 300 includes sending the 3-D heat source grid information to a heat solver, at 310. For example, referring to FIG. 1, the extractor 108 may send the 3-D heat source grid information 138 to the heat solver 118.

The method 300 includes calculating, at the circuit simulator, current waveforms and temperature waveforms, at 312. For example, referring to FIG. 1, the circuit simulator 112 may calculate the current waveforms 154 and the temperature waveforms 156. The method 300 includes sending the current waveforms to the EM/IR analyzer, at 314. For example, referring to FIG. 1, the circuit simulator 112 may send the current waveforms 154 to the EM/IR analyzer 110. In the particular embodiment illustrated in FIG. 3, the method 300 includes sending the temperature waveforms to the heat solver, at 316. For example, referring to FIG. 1, the circuit simulator 112 may send the temperature waveforms 156 to the heat solver 118.

The method 300 includes calculating, at the EM/IR analyzer, current information, at 318. In some cases, the calculated current information may include a peak current value ($I_{peak}$, a direct current value ($I_{dc}$), and a root-mean-square (RMS) current value ($I_{rms}$), among other alternatives. For example, referring to FIG. 1, the EM/IR analyzer 110 may calculate current information (e.g., $I_{peak}$, $I_{dc}$, $I_{rms}$) based on the current waveforms 154 received from the circuit simulator 112.

In the particular embodiment illustrated in FIG. 3, the method 300 includes calculating, at the heat solver, effective temperatures, at 320. For example, referring to FIG. 1, the heat solver 118 may calculate the 3-D thermal map 120. The method 300 includes sending the effective temperatures to the EM/IR analyzer, at 322. For example, referring to FIG. 1, the heat solver 118 may send the effective temperatures 122 to the EM/IR analyzer 110.

The method 300 includes determining, at the EM/IR analyzer, EM/IR pass/fail status based on the wire information (generated based on the layout information), current density information, and the effective temperatures (calculated at the heat solver), at 324. For example, referring to FIG. 1, the EM/IR analyzer 110 may utilize the wire information 136, the current waveforms 154, and the effective temperatures 122 to determine EM/IR pass/fail status based on a comparison to the EM/IR rules 140.

Thus, FIG. 3 illustrates another example of FEOL/BEOL heat source integration for electromigration checking FIG. 3 illustrates that an EM/IR analyzer may utilize currents from a simulator to compute $I_{peak}$, $I_{rms}$ and $I_{dc}$, and the EM/IR analyzer may utilize effective heat information combined with wire information and current density information to determine EM/IR pass/fail status.

Figure 4:
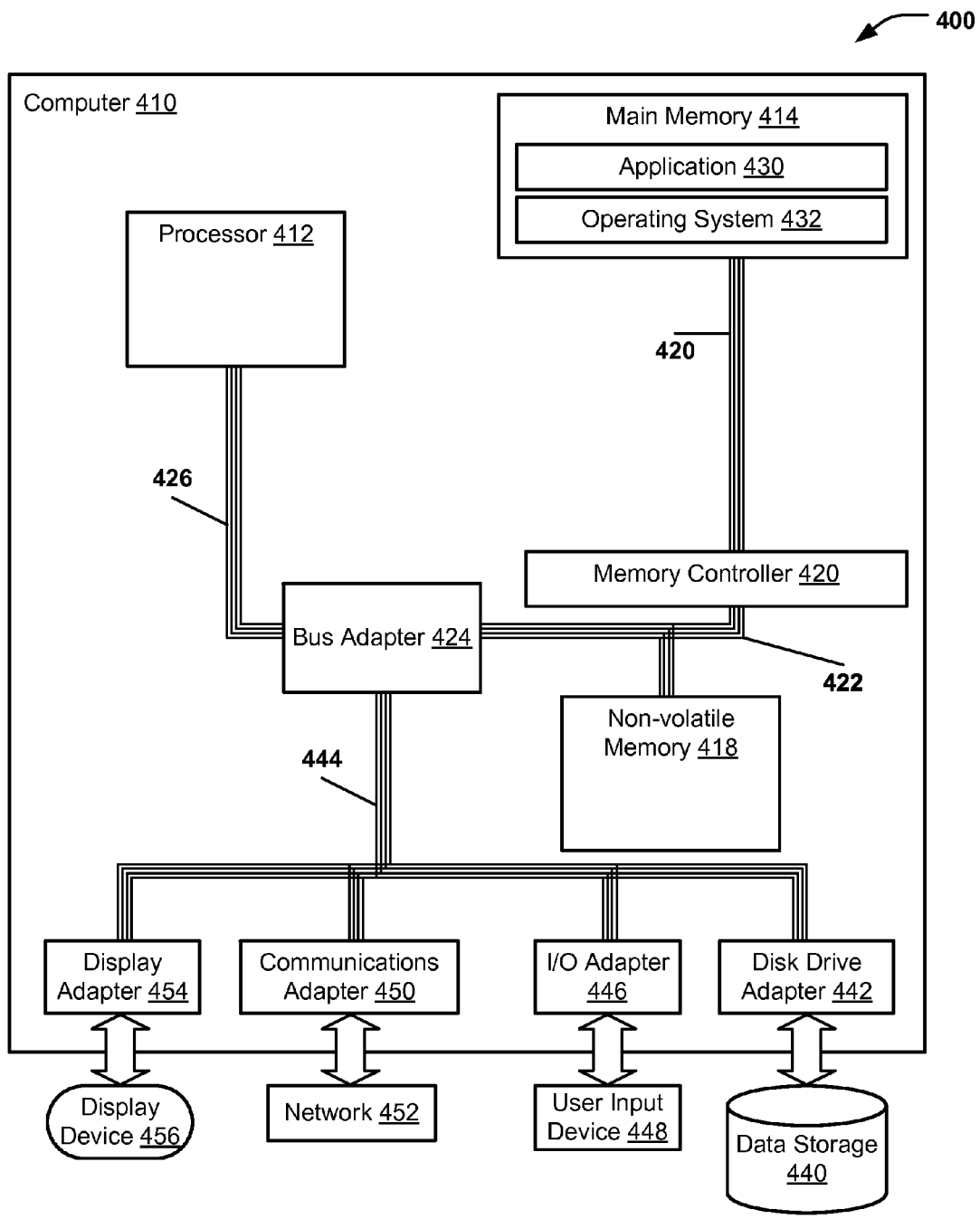
FIG. 4 is a block diagram of an exemplary computer system operable to support embodiments of computer-implemented methods, computer program products, and system components as illustrated in FIGS. 1-3.

Referring to FIG. 4, an exemplary automated computing machinery including a computer 410 is shown. The computer 410 is an exemplary implementation of the computing device 102 of FIG. 1. The computer 410 includes at least one computer processor (CPU) 412 as well as main memory 414, a memory controller 416, and a non-volatile memory 418. The main memory 414 is connected through a memory bus 420 to the memory controller 416. The memory controller 420 and the non-volatile memory 414 are connected through a memory bus 422 and a bus adapter 424 to the processor 412 through a processor bus 426.

Stored at the memory 414 is an application 432 that may be a module of user-level computer program instructions for carrying out particular tasks (e.g., the operations described with respect to FIGS. 1-3, etc.). Also stored at the main memory 414 is an operating system 432. Operating systems include, but are not limited to, UNIX® (a registered trademark of The Open Group), Linux® (a registered trademark of Linus Torvalds), Windows® (a registered trademark of Microsoft Corporation, Redmond, Wash., United States), AIX® (a registered trademark of International Business Machines (IBM) Corp., Armonk, N.Y., United States) i5/OS® (a registered trademark of IBM Corp.), and others as will occur to those of skill in the art. The operating system 432 and the application 430 in the example of FIG. 4 are shown in the main memory 414, but components of the aforementioned software may also, or in addition, be stored at non-volatile memory (e.g., on data storage, such as illustrative data storage 440 and/or the non-volatile memory 418).

The computer 410 includes a disk drive adapter 442 coupled through an expansion bus 444 and the bus adapter 424 to the processor 412 and other components of the computer 410. The disk drive adapter 442 connects non-volatile data storage to the computer 410 in the form of the data storage 440 and may be implemented, for example, using Integrated Drive Electronics ("IDE") adapters, Small Computer System Interface ("SCSI") adapters, Serial Attached SCSI ("SAS") adapters, and others as will occur to those of skill in the art. Non-volatile computer memory also may be implemented as an optical disk drive, electrically erasable programmable read-only memory (so-called "EEPROM" or "Flash" memory), RAM drives, and other devices, as will occur to those of skill in the art.

The computer 410 also includes one or more input/output ("I/O") adapters 446 that implement user-oriented input/output through, for example, software drivers and computer hardware for controlling input and output to and from user input devices 448, such as keyboards and mice. In addition, the computer 410 includes a communications adapter 450 for data communications with a data communications network 452. The data communications may be carried out serially through Recommended Standard 232 (RS-232) connections (sometimes referred to as "serial" connections), through external buses such as a Universal Serial Bus ("USB"), through data communications networks such as internet protocol (IP) data communications networks, and in other ways as will occur to those of skill in the art. The communications adapter 450 implements the hardware level of data communications through which one computer sends data communications to another computer, directly or through a data communications network. Examples of the communications adapter 450 suitable to use in the computer 410 include, but are not limited to, modems for wired dial-up communications, Ethernet (Institute of Electrical and Electronics Engineers (IEEE) 802.3) adapters for wired network communications, and IEEE 802.11 adapters for wireless network communications. The computer 410 also includes a display adapter 454 that facilitates data communication between the bus adapter 424 and a display device 456, enabling the application 430 to visually present output on the display device 456.

Particular embodiments described herein may take the form of an entirely hardware embodiment, an entirely software embodiment, or an embodiment containing both hardware and software elements. In a particular embodiment, the disclosed methods are implemented in software that is embedded in processor readable storage medium and executed by a processor that includes but is not limited to firmware, resident software, microcode, etc.

Further, embodiments of the present disclosure, may take the form of a computer program product accessible from a computer-usable or computer-readable storage medium providing program code for use by or in connection with a computer or any instruction execution system. For the purposes of this description, a computer-usable or computer-readable storage medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories that may provide temporary or more permanent storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A computer-implemented method comprising:
receiving, at an extractor, layout information associated with a circuit design;
generating three-dimensional (3-D) heat source grid information based on the layout information, an extracted netlist, and wire information;
sending the wire information to an electromigration(EM)/current(IR) analyzer;
sending the extracted netlist to a circuit simulator, the circuit simulator configured to generate temperature waveforms and current waveforms based on the extracted netlist;
sending the 3-D heat source grid information to a thermal analysis component, the thermal analysis component configured to generate heat source information to be provided to the EM/IR analyzer; and
determining, at the EM/IR analyzer, an electromigration risk associated with a wire based on the wire information, the current waveforms, and the heat source information.

2. The computer-implemented method of claim 1, wherein the thermal analysis component includes a hot spot analyzer.

3. The computer-implemented method of claim 2, wherein the heat source information includes a 3-D thermal map that is generated based on the 3-D heat source grid information and the temperature waveforms.

4. The computer-implemented method of claim 1, wherein the thermal analysis component includes a heat solver.

5. The computer-implemented method of claim 4, wherein the heat source information includes effective temperature information that is generated based on the 3-D heat source grid information and the temperature waveforms.

6. The computer-implemented method of claim 1, wherein the circuit simulator utilizes a front-end-of-line (FEOL) compact model to calculate FEOL heat sources.

7. The computer-implemented method of claim 1, wherein the circuit simulator utilizes a back-end-of-line (BEOL) compact model to calculate BEOL heat sources.

8. The computer-implemented method of claim 1, further comprising determining that the electromigration risk associated with the wire satisfies an EM/IR rule.

9. The computer-implemented method of claim 8, further comprising identifying the wire for a wire width reduction.

10. The computer-implemented method of claim 1, further comprising:
determining that the electromigration risk associated with the wire fails to satisfy an EM/IR rule; and
identifying the wire for a wire width adjustment.

11. A computer-readable storage device comprising instructions that, when executed by a computing device, cause the computing device to perform operations comprising:
generating three-dimensional (3-D) heat source grid information based on layout information associated with a circuit design, an extracted netlist, and wire information;
sending the wire information to an electromigration(EM)/current(IR) analyzer;
sending the extracted netlist to a circuit simulator, the circuit simulator configured to generate temperature waveforms and current waveforms based on the extracted netlist;
sending the 3-D heat source grid information to a thermal analysis component, the thermal analysis component configured to generate heat source information to be provided to the EM/IR analyzer; and
determining, at the EM/IR analyzer, an electromigration risk associated with a wire based on the wire information, the current waveforms, and the heat source information.

12. The computer-readable storage device of claim 11, wherein the thermal analysis component includes a hot spot analyzer, and wherein the heat source information includes a 3-D thermal map that is generated based on the 3-D heat source grid information and the temperature waveforms.

13. The computer-readable storage device of claim 11, wherein the thermal analysis component includes a heat solver, and wherein the heat source information includes effective temperature information that is generated based on the 3-D heat source grid information and the temperature waveforms.

14. The computer-readable storage device of claim 11, wherein the circuit simulator utilizes a front-end-of-line (FEOL) compact model to calculate FEOL heat sources.

15. The computer-readable storage device of claim 11, wherein the circuit simulator utilizes a back-end-of-line (BEOL) compact model to calculate BEOL heat sources.

16. A computing device comprising:
an extractor configured to generate three-dimensional (3-D) heat source grid information based on layout information associated with a circuit design, an extracted netlist, and wire information;
a circuit simulator configured to:
receive the extracted netlist from the extractor; and
generate temperature waveforms and current waveforms based on the extracted netlist;
a thermal analysis component configured to:
receive the 3-D heat source grid information from the extractor; and
generate heat source information; and
an electromigration(EM)/current(IR) analyzer configured to:
receive the wire information from the extractor;
receive the heat source information from the thermal analysis component; and
determine an electromigration risk associated with a wire based on the wire information, the current waveforms, and the heat source information.

17. The computing device of claim 16, wherein the thermal analysis component includes a hot spot analyzer, and wherein the heat source information includes a 3-D thermal map that is generated based on the 3-D heat source grid information and the temperature waveforms.

18. The computing device of claim 16, wherein the thermal analysis component includes a heat solver, and wherein the heat source information includes effective temperature information that is generated based on the 3-D heat source grid information and the temperature waveforms.

19. The computing device of claim 16, wherein the circuit simulator is configured to utilize a front-end-of-line (FEOL) compact model to calculate FEOL heat sources.

20. The computing device of claim 16, wherein the circuit simulator is configured to utilize a back-end-of-line (BEOL) compact model to calculate BEOL heat sources.

* * * * *